United States Patent [19]

Saibara et al.

[11] Patent Number: 5,944,883

[45] Date of Patent: Aug. 31, 1999

[54] ULTRAFINE PARTICLE ORGANIC PIGMENT COLOR INK AND METHOD FOR PRODUCING THE SAME

[75] Inventors: Shoji Saibara, Toride; Shigeo Aoyama, Ibaraki-ken; Yuichi Sakurai, Toride, all of Japan

[73] Assignee: Hitachi Maxell, Ltd., Osaka

[21] Appl. No.: 08/779,079

[22] Filed: Jan. 8, 1997

[30] Foreign Application Priority Data

Jan. 26, 1996 [JP] Japan .................................. 8-032863

[51] Int. Cl.$^6$ ...................................................... C09D 11/02
[52] U.S. Cl. ...................................... 106/31.86; 106/31.89
[58] Field of Search .............................. 106/31.86, 31.89

[56] References Cited

U.S. PATENT DOCUMENTS

| | | | |
|---|---|---|---|
| 4,508,570 | 4/1985 | Fujii et al. | 106/31.58 |
| 4,509,982 | 4/1985 | Iijima | 106/31.86 |
| 4,853,036 | 8/1989 | Koike et al. | 106/31.58 |
| 5,067,980 | 11/1991 | Koike et al. | 106/31.58 |
| 5,395,434 | 3/1995 | Tochihara et al. | 106/31.58 |
| 5,529,617 | 6/1996 | Yamashita et al. | 106/31.58 |

FOREIGN PATENT DOCUMENTS 56-147871  11/1981  Japan .

*Primary Examiner*—Helene Klemanski
*Attorney, Agent, or Firm*—Birch, Stewart, Kolasch & Birch, LLP

[57] ABSTRACT

Disclosed is an ultrafine particle organic pigment color ink which comprises an ultrafine particle organic pigment having a chromatic color, an amphi-philic compound of which the hydrophilic portion is polyethylene oxide and the hydrophobic portion is an alkyl group and/or an aromatic ring and an aqueous solvent. A method for producing the ink is also disclosed. The ink is excellent in storage stability, causes no clogging of head and, furthermore, is excellent in quality of the resulting print and light resistance.

14 Claims, No Drawings

ULTRAFINE PARTICLE ORGANIC PIGMENT COLOR INK AND METHOD FOR PRODUCING THE SAME

BACKGROUND OF THE INVENTION

The present invention relates to an ultrafine particle organic pigment color ink, particularly, to an ink suitable for ink jet recording carried out by squirting ink droplets from a printing head, and, more particularly, to a pigment color ink which can give printed images of high quality and excellent light resistance.

In the conventional ink jet recording, dye inks prepared by dissolving various dyes in water or mixed solvents of water and organic solvents have been used.

However, dye inks have the defects that they are apt to blot on the recording paper to deteriorate the quality of the resulting printed images and the resulting images are inferior in light resistance and water resistance.

Under the circumstances, investigation has been made on pigment inks which blot less and can provide printed images excellent in quality and high in light resistance and water resistance. However, pigment inks suffer from problems in dispersibility and dispersion stability of pigment particles in the ink and, furthermore, the problem of clogging the printing head.

JP-A-56-147871 proposes a method for the solution of these problems. That is, it discloses an aqueous medium comprising at least a pigment, a polymer dispersant and a nonionic surface active agent.

However, with recent progress of ink jet printers for producing further minute images, the pigments having a particle diameter of several hundred μm to several μm as described in JP-A-56-147871 often cause clogging of printing head of the ink jet printer and result in insufficient image quality.

At present, black inks comprising carbon black are practically used, but inks having chromatic colors such as cyan, magenta and yellow have not yet been put to practical use. It is considered that this is because carbon black of small primary particle diameter can be easily obtained and, further, it can be relatively easily dispersed due to the presence of functional groups on the particle surface while organic pigments of chromatic colors are large in primary particle diameter and, in addition, they can hardly be made into fine particles and can hardly be highly stabilized in dispersibility owing to the absence of functional groups on the particle surface.

That is, the dispersion method employed for carbon black is not necessarily effective for organic pigments of chromatic colors. For these reasons, color inks comprising organic pigments having chromatic colors have been delayed in practical use and have not yet become popular.

On the other hand, even if organic pigments of chromatic colors can be made into fine particles, in the case of the particles being merely made fine, viscosity of the pigment inks increases and, furthermore, dispersion stability of once settled pigment is low and it forms so-called hard cake which is difficult to redisperse. For a pigment ink used for ink jet recording, it is essential for prevention of pigment from settling to make it into fine particles, but this causes problems such as increase in viscosity of ink and lacking of dispersion stability.

SUMMARY OF THE INVENTION

The object of the present invention is to develop a method for making an organic pigment having a chromatic color into fine particles used for pigment color ink in ink jet recording, and a new composition of the ink and a new method for producing the ink which does not increase in viscosity even after the organic pigment is made into fine particles and which does not lack dispersion stability. The result of the invention is a pigment color ink capable of giving printed images excellent in quality, light resistance and storage stability for a long period of time and causing no clogging of printing head.

The present invention provides an ultrafine particle organic pigment color ink which is a dispersion containing an ultrafine particle organic pigment having a chromatic color, an amphiphilic compound of which the hydrophilic portion is polyethylene oxide and the hydrophobic portion contains an alkyl group and/or an aromatic ring and an aqueous solvent, and a method for producing the ink.

DETAILED DESCRIPTION OF THE INVENTION

In the amphiphilic compound contained in the ultrafine particle organic pigment color ink of the present invention, the molecular weight (x) of polyethylene oxide which is the hydrophilic portion is in the range of $300 \leq x \leq 3500$, the molecular weight (y) of the hydrophobic portion is in the range of $100 \leq y \leq 500$, and the molecular weight (x) of ethylene oxide unit of polyethylene oxide and the molecular weight (y) of the hydrophobic portion can satisfy the relation of the following formula (1).

$$1 \leq x/y \leq 20 \tag{1}$$

According to the finding by the inventors, since an organic pigment having a chromatic color has no functional groups on the surface, an interaction between the pigment surface and the hydrophobic group is important for dispersing the organic pigment of a chromatic color. When the amphiphilic compound of the present invention is contained in the pigment color ink, the compound is adsorbed to the hydrophobic portion which has an interaction with the surface of the organic pigment of a chromatic color, thereby to weaken the cohesive force between the organic pigments of a chromatic color and an ink high in dispersion stability of pigment particles can be obtained and, furthermore, once settled pigment can be easily redispersed. Thus, it becomes possible to disperse uniformly the ultrafine particle organic pigment having chromatic color with low viscosity, and there can be provided a pigment color ink which can produce printed images of excellent quality, is excellent in storage stability and hardly causes clogging of printing head because the once settled pigment can be easily redispersed.

The mechanism of the amphiphilic compound exhibiting the above-mentioned effects is not clear, but it can be presumed that the hydrophobic portion in the amphiphilic compound of the present invention is strongly adsorbed onto the surface of the organic pigment particles in an aqueous solvent such as water or a mixed solvent of water and an organic solvent which is a general solvent for the ink for ink jet recording, and cohesive force between the organic pigment particles is reduced by the steric repulsion force generated by the polyethylene oxide which is a hydrophilic portion of the amphiphilic compound.

It is preferred that the amphiphilic compound of the present invention has the hydrophilic portion of polyethylene oxide of which the molecular weight (x) is in the range of $300 \leq x \leq 3500$. When the molecular weight (x) is 300 or more, the cohesive force between the organic pigment particles can be permitted not to increase by the steric repulsion force. When the molecular weight (x) is 3500 or less, the solubility in water is prevented from becoming too high and the proportion of the amphiphilic compound freely present in the solution can be reduced.

The molecular weight (y) of the hydrophobic portion of the amphiphilic compound of the present invention is preferably $100 \leq y \leq 500$. This is for inhibition of decrease in adsorption to the surface of the organic pigment particles due to decrease of hydrophobic property, and for inhibition of increase in viscosity due to too low solubility in water. The hydrophobic portion contains an alkyl group and/or an aromatic ring. More preferably, it contains both the alkyl group and the aromatic group. In general, most of organic pigments contain aromatic rings. Therefore, if an aromatic ring is present in the hydrophobic portion of the amphiphilic compound of the present invention, the compound is strongly adsorbed to the organic pigment particles by the interaction with the aromatic ring or a heterocyclic ring present in the pigment and this further effectively reduces the cohesive force between the organic pigment particles.

Furthermore, the amphiphilic compound preferably satisfies the relation of the following formula (1) between the molecular weight (x) of ethylene oxide unit of polyethylene oxide and the molecular weight (y) of the hydrophobic portion. When the relation between the molecular weights (x) and (y) is within the range of the following formula, the balance of hydrophilic-hydrophobic properties can be maintained and the dispersibility and dispersion stability of the organic pigment particles can be enhanced.

$$1 \leq x/y \leq 20 \qquad (1)$$

The amount of the amphiphilic compound of the present invention is usually 0.1–20% by weight, preferably 0.1–10% by weight based on the total ink composition. When the amount is within this range, dispersibility and dispersion stability of organic pigment particles are enhanced and, furthermore, the once settled pigment can be easily redispersed.

The ink of the present invention comprising an organic pigment of a chromatic color, an amphiphilic compound of which the hydrophilic portion is polyethylene oxide and the hydrophobic portion is an alkyl group and/or an aromatic ring and an aqueous solvent can be expected to be further improved in storage stability by adding an anionic dispersant.

The anionic dispersant is preferably a copolymer comprising a unit containing an anionic functional group and a unit containing an aromatic ring and/or an alkyl group.

It can be presumed that the unit containing aromatic ring and/or alkyl group of the anionic dispersant is strongly adsorbed onto the surface of the organic pigment and, thus, the anionic dispersant has an effect of reducing the cohesive force between organic pigment particles by the electrostatic repulsion force generated by the unit containing anionic functional group. The anionic functional group includes, for example, carboxyl group, sulfone group, phosphoric acid group or the like. These functional groups may be present as a salt with a metal such as sodium or an ammonium salt.

The molecular weight (m) of the anionic dispersant is not critical, but preferably in the range of $1000 \leq m \leq 30000$. This is for reducing cohesive force between organic pigment particles by the electrostatic repulsion force and for not forming coarse particles agglomerated owing to adsorption to a plurality of organic pigment particles.

The amount of the anionic dispersant is smaller than that of the amphiphilic compound and the sum of the amount of the anionic dispersant and that of the amphiphilic compound is 0.1–20% by weight, preferably 0.1–10% by weight based on the total ink composition. Within this range, the viscosity of the pigment ink can be reduced and the dispersibility and the dispersion stability of the organic pigment particles can be enhanced.

Moreover, the ultrafine particle organic pigment color ink of the present invention can be improved in penetration into a paper and, further, bubbling of the ink can be inhibited by adding acetylenic glycol to the ink.

The pigment color ink is prepared by dispersing a mixed solution containing at least an organic pigment, an amphiphilic compound of which the hydrophilic portion is polyethylene oxide and the hydrophobic portion is an alkyl group and/or an aromatic ring and an aqueous solvent, if necessary, with addition of various additives. Alternatively, a dispersion of high pigment concentration may be first prepared and, then, diluted by adding a solvent and various additives, and this can be used as an ink.

As the organic pigment used in the present invention, there may be equally used conventionally known organic pigments having chromatic color tones such as cyan, magenta, yellow, red, green, blue, etc. These organic pigments of chromatic colors may be used each alone or in combination of two or more. The organic pigments can be used in either a dry state or wet state. In order that when an acceleration of 10000 G is applied to the organic pigment color ink for 1 hour, the organic pigment particles in the solution can move only at most 10 cm, the particle diameter is preferably 100 nm or less. If the moving distance exceeds 10 cm, dispersion stability in the state of ink cannot be maintained. The particle diameter is more preferably 50 nm or less.

The amount of the organic pigment used in the present invention is usually 0.1–20% by weight, preferably 1.0–10% by weight based on the total ink composition. When the amount is within this range, color tone and optical density as an ink are satisfactory, and viscosity and dispersion stability of the pigment ink can be satisfied.

The surface tension of the ultrafine particle organic pigment color ink obtained in the present invention is preferably 20–70 dynes/cm. Furthermore, the viscosity is usually 10 cp or less, more preferably 5 cp or less at 25° C. The ultrafine particle organic pigment color ink obtained in the present invention which possesses the above surface tension and viscosity makes it possible to carry out stable printing by ink jet printers.

In the present invention, as aqueous solvents, there are used water or mixed solvents comprising water and compounds which are used for preventing wetting and clogging. Examples of these compounds are ethylene glycol, diethylene glycol glycerin, triethylene glycol, tripropylene glycol, dimethyl sulfoxide, diacetone alcohol, glycerin monoallyl ether, propylene glycol, polyethylene glycol, thiodiglycol, N-methyl-2-pyrrolidone, 2-pyrrolidone, γ-butyrolactone, 1,3-dimethyl-2-imidazolidinone, sulfolane, trimethylolpropane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxy-ethylurea, urea, acetonylacetone, pentaerythritol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerin monoacetate, glycerin diacetate, glycerin triacetate, ethylene glycol monomethyl ether acetate, diethylene glycol monomethyl ether acetate, cyclohexanol, 1-butanol, 2,5-hexanediol, ethanol, n-propanol, 2-propanol, 1-methoxy-2-propanol, furfuryl alcohol, tetrahydrofurfuryl alcohol, 1,2-butanediol, 1,4-butanediol, 1,3-butanediol, 2,4-pentanediol, 1,5-pentanediol, 2-methyl-2,4-pentanediol, 1,2-cyclohexanediol, 1,4-cyclohexanediol, trimethylolethane, trimethylolpropane, 1,2,4-butanetriol, 1,2,6-hexanetriol, 1,2,5-pentanetriol, 3-methyl-1,5-pentanediol, 3-hexene-2,5-diol, acetone, methyl ethyl ketone, tetrahydrofuran, dioxane, ethyl acetate, propylene carbonate, dimethyl sulfoxide, and dimethylformamide.

As dispersing devices for producing the ultrafine particle organic pigment color ink of the present invention, there may be employed any generally used dispersing devices. They include, for example, container-driving mills such as roll mill, ball mill, centrifugal mill and planetary ball mill, high-speed rotary mills such as sand mill, and medium-agitation mill such as agitation tank type mill. A specific method for producing the ultrafine particle organic pigment color ink comprises subjecting an ink to dispersion by a planetary ball mill or sand mill using ceramic beads of 0.01–1.0 mm in particle diameter. It is preferred that in the case of using the planetary ball mill, the dispersion is carried out at an acceleration of 5–50 G and in the case of the sand mill, it is carried out at a peripheral speed of 5–20 m/s with a filling rate of the ceramic beads of 50–90%.

In the present invention, it is also possible to use various additives conventionally used in inks for ink jet printers, such as clogging inhibitor for printing head, anti-foaming agent, drying inhibitor, fungicide, humectant, pH adjustor and water-resistance imparting agent for printed images.

The ink of the present invention can also be utilized as general aqueous printing ink or coating composition and for special uses such as for preparing color filters of liquid crystal displays in addition to the ink for ink jet printers. Furthermore, the ultrafine particle organic pigment obtained by the method of the present invention can also be used as non-aqueous ink or coating composition by replacing the aqueous solvent.

DESCRIPTION OF PREFERRED EMBODIMENTS

The present invention will be explained in more detail by the following examples.

EXAMPLE 1

The following components were dispersed for 4 hours by a sand mill using zirconia beads of 0.3 mm in particle diameter to obtain a dispersion.

|  | Part by weight |
| --- | --- |
| Yellow pigment (CHROMOFINE YELLOW 2700E manufactured by Dainichiseika Color & Chemicals Mfg. Co., Ltd.) | 10 |
| Polyoxyethylenenonylphenyl ether (amphiphilic compound: x = 897, y = 203) | 4.2 |
| Acetylenic glycol | 0.9 |
| Deionized water | 84.9 |

Twenty parts by weight of diethylene glycol and 80 parts by weight of deionized water were added dropwise to 100 parts by weight of the resulting dispersion with stirring over a period of 30 minutes, followed by filtration with a 1 micron filter to obtain an ink.

EXAMPLE 2

An ink was obtained in the same manner as in Example 1, except that a cyan pigment (KET BLUE 111 manufactured by Dainippon Ink & Chemicals Inc.) was used in place of the yellow pigment used in Example 1.

EXAMPLE 3

An ink was obtained in the same manner as in Example 1, except that a magenta pigment (CHROMOFINE MAGENTA 6887 manufactured by Dainichiseika Color & Chemicals Mfg. Co., Ltd.) was used in place of the yellow pigment used in Example 1.

EXAMPLE 4

The following components were dispersed by a sand mill using zirconia beads of 0.3 mm in particle diameter for 4 hours to obtain a dispersion. The recurring unit of the styrene-acryl copolymer (anionic dispersant) is shown below.

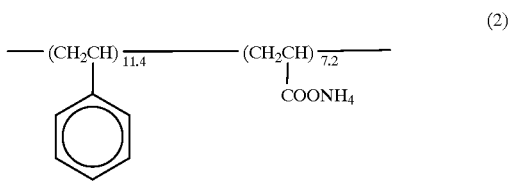

(2)

|  | Part by weight |
| --- | --- |
| Magenta pigment (CHROMOFINE MAGENTA 6887 manufactured by Dainichiseika Color & Chemicals Mfg. Co., Ltd.) | 10 |
| Polyoxyethylenenonylphenyl ether (amphiphilic compound: x = 897, y = 203) | 4.2 |
| Styrene-acryl copolymer (anionic dispersant) | 0.9 |
| Acetylenic glycol | 0.9 |
| Deionized water | 84 |

Twenty parts by weight of diethylene glycol and 80 parts by weight of deionized water were added dropwise to 100 parts by weight of the resulting dispersion with stirring over a period of 30 minutes, followed by filtration with a 1 micron filter to obtain an ink.

COMPARATIVE EXAMPLE 1

An ink was obtained in the same manner as in Example 1, except that polyoxyethylenenonylphenyl ether (x=259, y=203) was used in place of the polyoxyethylenenonylphenyl ether used in Example 1.

COMPARATIVE EXAMPLE 2

An ink was obtained in the same manner as in Example 2, except that polyoxyethylenenonylphenyl ether (x=259, y=203) was used in place of the polyoxyethylenenonylphenyl ether used in Example 2.

COMPARATIVE EXAMPLE 3

An ink was obtained in the same manner as in Example 3, except that polyoxyethylenenonylphenyl ether (x=259, y=203) was used in place of the polyoxyethylenenonylphenyl ether used in Example 3.

COMPARATIVE EXAMPLE 4

An ink was obtained in the same manner as in Example 4, except that polyoxyethylenenonylphenyl ether (x=259, y=203) was used in place of the polyoxyethylenenonylphenyl ether used in Example 4.

COMPARATIVE EXAMPLE 5

The following components were dispersed by a sand mill using zirconia beads of 0.3 mm in particle diameter for 4 hours to obtain a dispersion.

| | Part by weight |
|---|---|
| Magenta pigment (CHROMOFINE MAGENTA 6887 manufactured by Dainichiseika Color & Chemicals Mfg. Co., Ltd.) | 10 |
| Polyoxyethylenenonylphenyl ether (amphiphilic compound: x = 897, y = 203) | 0.9 |
| Styrene-acryl copolymer (anionic dispersant) | 4.2 |
| Acetylenic glycol | 0.9 |
| Deionized water | 84 |

Twenty parts by weight of diethylene glycol and 80 parts by weight of deionized water were added dropwise to 100 parts by weight of the resulting dispersion with stirring over a period of 30 minutes, followed by filtration with a 1 micron filter to obtain an ink.

The particle diameter of the pigment in the ink obtained in each of the above examples, dispersion stability of the ink, occurrence or unoccurrence of clogging of the head, quality of the printed images, viscosity of the ink and light resistance of the printed images are shown in Table 1.

TABLE 1

| | Particle diameter (nm) | Dispersion stability | Redispersibility | Viscosity (cp) | Clogging | Quality of printed image | Light resistance |
|---|---|---|---|---|---|---|---|
| Example 1 | 36 | ○ | ○ | 2.1 | ○ | 1.2 | ○ |
| Example 2 | 20 | ○ | ○ | 1.5 | ○ | 1.2 | ○ |
| Example 3 | 32 | ○ | ○ | 2.0 | ○ | 1.3 | ○ |
| Example 4 | 24 | ○ | ○ | 1.4 | ○ | 1.3 | ○ |
| Comparative Example 1 | 210 | x | Δ | 19.5 | x | <1.0 | ○ |
| Comparative Example 2 | 160 | x | Δ | 17.5 | x | <1.0 | ○ |
| Comparative Example 3 | 190 | x | Δ | 18.0 | x | <1.0 | ○ |
| Comparative Example 4 | 180 | x | Δ | 17.0 | x | <1.0 | ○ |
| Comparative Example 5 | 200 | x | Δ | 22.0 | x | <1.0 | ○ |

In the above Table, the particle diameter of pigment is evaluated using a scanning electron microscope (S-4000 manufactured by Hitachi Ltd.). With regard to the dispersion stability, the ink is filled in a sample tube at a depth of 15 cm and an acceleration of 10000 G is applied thereto for 1 hour, and when the pigment is completely settled, this is expressed by x and the other case is expressed by ○. The redispersibility is evaluated by forcedly settling the pigment by subjecting the ink to centrifugal treatment at 10000 rpm for 5 hours using a centrifugal machine, and ○ indicates that the pigment is readily redispersed and Δ indicates that the redispersion is difficult. The viscosity is measured by a viscometer (RL100 manufactured by Toki Sangyo Co., Ltd.) at 25° C. As for the clogging of head, after a certain quantity of letters are printed, the head is left to stand for 1 day at 50° C. without capping and, then, subjected to cleaning operation for getting rid of the clogging, and the number of the cleaning operations before normal printing becomes possible is examined. When the normal printing becomes possible after cleaning operations of 1–5 times, this is indicated by ○; when the normal printing becomes possible after cleaning operations of 6–10 times, this is indicated by Δ; and when the normal printing becomes possible after cleaning operations of 11 times or more, this is indicated by x. Regarding the quality of printed image, optical density of a recorded pattern printed on a paper by an ink jet printer is measured by Macbeth portable densitometer (RD-12000 manufactured by Sakata Inks Co., Ltd.). With reference to the light resistance, the recorded pattern used for evaluation of the quality of printed image is exposed to a xenon lamp and optical density when irradiation energy reaches 500 $KJ/m^2$ is measured and when deterioration of the optical density is less than 15% based on the initial optical density, this is indicated by ○.

In the inks obtained in Examples 1–4, the molecular weight (x) of polyethylene oxide which is the hydrophilic portion of the amphiphilic compound was in the range of $300 \leq x \leq 3500$. Therefore, these inks were small in particle diameter of the pigment, excellent in dispersion stability and redispersibility and low in viscosity, and they hardly caused clogging and gave good quality of printed image as compared with the inks obtained in Comparative Examples 1–4. Since the ink of Example 4 contained an anionic dispersant, the particle diameter of the pigment was further smaller and the viscosity was further lower, and, thus, the quality of printed image was further improved. It can be further seen that as compared with the ink of Comparative Example 5, the ink of Example 4 was enhanced in the dispersion stability by containing the anionic dispersant in an amount smaller than the amount of the amphiphilic compound. As is clear from these results, since the pigment is ground to very fine particles and dispersed in the color ink of the present invention, the ink is excellent in storage stability, causes no clogging of head and, furthermore, is excellent in quality of the resulting print and light resistance.

What is claimed is:

1. An ultrafine particle organic pigment color ink which comprises an ultrafine particle organic pigment having a chromatic color, an amphiphilic compound of which the hydrophilic portion is polyethylene oxide and the hydrophobic portion is an alkyl group and/or an aromatic ring, and an aqueous solvent, wherein the molecular weight (x) of the polyethylene oxide which is the hydrophilic portion of the amphiphilic compound and the molecular weight (y) of the hydrophobic portion of the amphiphilic compound have the relation of the following formula (1):

$$1 \leq x/y \leq 20 \tag{1}.$$

2. An ultrafine particle organic pigment color ink according to claim 1, wherein molecular weight (x) of the polyethylene oxide which is the hydrophilic portion of the amphiphilic compound is in the range of $300 \leq x \leq 3500$.

3. An ultrafine particle organic pigment color ink according to claim 1, wherein molecular weight (y) of the hydrophobic portion of the amphiphilic compound is in the range of $100 \leq y \leq 500$.

4. An ultrafine particle organic pigment color ink according to claim 1, wherein the settling distance of the organic pigment when an acceleration of 10000 G is applied to the ink is 10 cm or less.

5. An ultrafine particle organic pigment color ink according to claim 1, wherein the organic pigment is ultrafine particle having a particle diameter of 100 nm or less.

6. An ultrafine particle organic pigment color ink according to claim 1, wherein the organic pigment is ultrafine particle having a particle diameter of 50 nm or less.

7. An ultrafine particle organic pigment color ink according to claim 1 which has a viscosity of 10 cp or lower at 25° C.

8. An ultrafine particle organic pigment color ink according to claim 1 which additionally contains an anionic dispersant.

9. A method for producing an ultrafine particle organic pigment color ink which comprises subjecting a mixture comprising an ultrafine particle organic pigment having a chromatic color, an amphiphilic compound of which the hydrophilic portion is polyethylene oxide and the hydrophobic portion is an alkyl group and/or an aromatic ring, and an aqueous solvent to grinding and dispersing of said organic pigment having the chromatic color by ceramic beads having a particle diameter of 0.01–1.0 mm.

10. A method for ink jet recording comprising spraying droplets of an ultrafine particle organic pigment of claim 1 from an ink jet printing head.

11. An ultrafine particle organic pigment color ink according to claim 3, wherein said hydrophobic portion contains an alkyl group and an aromatic group.

12. An ultrafine particle organic pigment color ink according to claim 1, wherein said amphiphilic compound is present in an amount of 0.1 to 10% by weight based on the total ink composition.

13. An ultrafine particle organic pigment color ink according to claim 1, wherein said ultrafine particle organic pigment color ink has a surface tension of 20–70 dynes/cm.

14. An ultrafine particle organic pigment color ink according to claim 1, wherein the viscosity is 5 cp or less at 25° C.

* * * * *